(12) United States Patent
Kawauchi

(10) Patent No.: US 7,664,189 B2
(45) Date of Patent: Feb. 16, 2010

(54) OFDM DEMODULATOR, RECEIVER, AND METHOD

(75) Inventor: Hidetoshi Kawauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 558 days.

(21) Appl. No.: 11/698,138

(22) Filed: Jan. 26, 2007

(65) Prior Publication Data

US 2007/0177685 A1 Aug. 2, 2007

(30) Foreign Application Priority Data

Jan. 30, 2006 (JP) ............................. 2006-021159

(51) Int. Cl.
*H04L 27/28* (2006.01)
*H04K 1/10* (2006.01)

(52) U.S. Cl. ................. 375/260; 375/229; 375/316; 375/324; 375/340

(58) Field of Classification Search ............. 375/260, 375/229, 316, 324, 340
See application file for complete search history.

(56) References Cited

U.S. PATENT DOCUMENTS

| | | | |
|---|---|---|---|
| 7,388,922 B2 * | 6/2008 | Yamagata | 375/260 |
| 7,440,506 B2 * | 10/2008 | Atungsiri et al. | 375/260 |
| 7,580,466 B2 * | 8/2009 | Ido | 375/260 |
| 2005/0213680 A1 | 9/2005 | Atungsiri et al. | |
| 2007/0036231 A1 | 2/2007 | Ido | |

FOREIGN PATENT DOCUMENTS

| | | |
|---|---|---|
| EP | 1 416 693 A2 | 5/2004 |
| EP | 1 580 951 A2 | 9/2005 |
| EP | 1 624 602 A1 | 2/2006 |
| GB | 2 412 551 A | 9/2005 |
| JP | 2001-177461 | 6/2001 |
| JP | 2001-292125 | 10/2001 |
| JP | 2002-261726 | 9/2002 |
| JP | 2002-344411 | 11/2002 |
| JP | 2004-153831 | 5/2004 |
| JP | 3559268 | 5/2004 |
| WO | WO 2004/100413 A1 | 11/2004 |

OTHER PUBLICATIONS

Ramasubramanian et al.; "An OFDM Timing Recovery Scheme with Inherent Delay-Spread Estimation"; Globecom01, 2001 IEEE Global Telecommunications Conference, New York, NY; IEEE, US, vol. 5 of 6, Nov. 25, 2001, pp. 3111-3115, XP010747382.

Speth M et al.; "Frame synchronization of OFDM systems in frequency selective fading channels"; Vehicular Technology Conference, 1997, IEEE 47th Phoenix, AZ, May 4-7, 1997, New York, NY IEEE, US, vol. 3, May 4, 1997, pp. 1807-1811, XP010229079.

* cited by examiner

*Primary Examiner*—Ted M Wang
(74) *Attorney, Agent, or Firm*—Finnegan, Henderson, Farabow, Garrett & Dunner, L.L.P.

(57) ABSTRACT

An orthogonal frequency division multiplexing (OFDM) demodulator demodulates an OFDM signal constituted by OFDM symbols each including at least an effective symbol and a scattered known signal. The OFDM demodulator includes a Fourier transform performing unit, a known signal extracting unit, a time dimension interpolation unit, a delay spread generating unit, a frequency dimension interpolation unit, and a waveform equalizing unit. The delay spread generating unit employs a time difference between a time point for a starting position of the Fourier transform operation performed by the Fourier transform performing unit and a time point at which a latest arriving path arrived as the delay spread.

7 Claims, 9 Drawing Sheets

OFDM DEMODULATOR, RECEIVER, AND METHOD

CROSS REFERENCES TO RELATED APPLICATIONS

The present invention contains subject matter related to Japanese Patent Application JP 2006-021159 filed in the Japanese Patent Office on Jan. 30, 2006, the entire contents of which are incorporated herein by reference.

BACKGROUND OF THE INVENTION

1. Field of the Invention

The present invention relates to OFDM (orthogonal frequency division multiplexing) demodulators and receivers for demodulating OFDM signals and methods for the same.

2. Description of the Related Art

A modulation system called orthogonal frequency division multiplexing (OFDM) system (hereinafter, simply referred to as an "OFDM system") is used for transmitting digital signals. In the OFDM system, a transmission band is provided with a number of orthogonal subcarriers, and data are assigned to the amplitude and the phase of each subcarrier with PSK (phase shift keying) and QAM (quadrature amplitude modulation) to perform digital modulation.

Application of the OFDM system to digital terrestrial broadcasting that is strongly affected by multipath interference has been widely discussed. Standards for digital terrestrial broadcasting employing the OFDM system include, for example, DVB-T (digital video broadcasting-terrestrial), ISDB-T (integrated services digital broadcasting-terrestrial), and ISDB-T$_{SB}$ (ISBD-T sound broadcasting).

As shown in FIG. 5, transmission signals according to the OFDM system are transmitted on a symbol-by-symbol basis. The symbols are called OFDM symbols. An OFDM symbol is constituted by an effective symbol representing a signal period during which an IFFT (inverse fast Fourier transform) operation is performed for transmission and a guard interval where a rear part of a waveform of the effective symbol is copied. The guard interval is arranged in a front part of the OFDM symbol. The duration of the guard interval is set at a quarter or one-eighth of the duration of the effective symbol.

OFDM receivers for receiving such OFDM signals perform an FFT (fast Fourier transform) operation using a FFT processing circuit to demodulate received OFDM signals. The OFDM receivers detect boundary positions of OFDM symbols, each of which is constituted by an effective symbol and a guard interval. The OFDM receivers then set a scope of the FFT operation (FFT window) having the same length as the effective symbol on the basis of the detected symbol boundary positions. The OFDM receivers extract data included in the part set as the FFT window from the OFDM symbol, and perform the FFT operation on the data.

In addition, the OFDM system specifies that a plurality of the above-described OFDM symbols collectively constitutes a unit of transmission called an OFDM frame. For example, in the ISDB-T standard, 204 OFDM symbols constitute an OFDM frame. In the OFDM system, for example, insertion positions of pilot signals are set for each OFDM frame as a unit.

In an OFDM system employing QAM system for modulating data signals onto each subcarrier, distortion is caused in the signals modulated onto each subcarrier by influences of a multipath or the like during transmission. This undesirably alters the characteristics of the amplitude and phase of each subcarrier. Accordingly, a receiving side is required to equalize the waveform of the received signals so that the amplitude and phase of each subcarrier are equalized. In the OFDM system, a transmitting side scatters pilot signals having a specific amplitude and a specific phase over OFDM symbols of transmission signals. The receiving side monitors the amplitude and phase of these pilot signals so as to determine the frequency characteristics of a transmission path. The receiving side is configured to equalize the received signals using the determined transmission path characteristics. In the OFDM system, pilot signals used for calculation of transmission path characteristics are called scattered pilot signals (hereinafter, referred to as "SP signals").

FIG. 6 shows an arrangement pattern of SP signals in OFDM symbols according to the DVB-T standard and the ISBD-T standard.

In the DVB-T standard and the ISBD-T standard, a BPSK (Binary Phase Shift Keying)-modulated SP signal is inserted every twelve subcarriers in a subcarrier dimension (frequency dimension). Additionally, in the DVB-T standard and the ISBD-T standard, an insertion position of an SP signal is shifted in the frequency dimension by three subcarriers for each OFDM symbol. As a result, an SP signal is inserted every four OFDM symbols in an OFDM symbol dimension (time dimension) with respect to the same subcarrier.

As described above, the DVB-T standard and the ISDB-T standard insert spatially scattered SP signals in OFDM symbols, thereby reducing the redundancy of SP signals relative to primary information to be transmitted.

When transmission path characteristics are calculated using the SP signals, it is possible to identify the characteristics of the subcarriers having the SP signals inserted therein. However, it may be impossible to directly calculate the characteristics of other subcarriers including the primary information. Thus, a receiving side performs a filtering operation on SP signals using a two-dimensional interpolation filter, thereby estimating the transmission path characteristics of other subcarriers including the primary information.

Generally, the estimation of transmission path characteristics with the two-dimensional interpolation filter is performed in the manner described below.

To estimate the transmission path characteristics, information components are firstly removed from the received OFDM signals, and only SP signals inserted at the positions shown in FIG. 6 are extracted.

Then, using a reference SP signal, modulation components are removed from the extracted SP signals. The modulation-component-free SP signals show transmission path characteristics of subcarriers having the SP signals inserted therein.

Subsequently, the modulation-component-free SP signals are supplied to a time dimension interpolation filter, so that time dimension interpolation is performed and the transmission path characteristics of subcarriers having SP signals are estimated for each OFDM symbol. As a result, as shown in FIG. 7, it is possible to estimate the transmission path characteristics for every three subcarriers in the frequency domain of all OFDM symbols.

Then, as shown in FIG. 8, the time-dimension-interpolated SP signals are supplied to a frequency dimension interpolation filter, and threefold oversampling is performed on the signals, thereby performing frequency dimension interpolation. Accordingly, the transmission path characteristics of all of the subcarriers in the OFDM symbols are estimated. As a result, it is possible to estimate the transmission path characteristics for all of the subcarriers of the received OFDM signals.

Meanwhile, terrestrial broadcasting waves are transmission paths transmitted under a multipath environment. That is, terrestrial broadcasting waves are strongly affected by delay waves depending on the environments surrounding a reception position, such as geographical features and the arrangement of buildings. Signals received by OFDM receivers may be a combined wave of a direct wave and a plurality of delay waves.

Accordingly, under a multipath environment, a plurality of symbol boundaries exists since a plurality of paths exists. Generally, intersymbol interference is avoided by setting an FFT window on the basis of a symbol boundary position of an earliest arriving path.

Now, methods for setting a position of an FFT window that determines an FFT processing starting position will be described.

In a first method for setting an FFT window, an OFDM signal not having undergone an FFT operation is delayed so as to determine the correlation between a waveform of a guard interval and a waveform of a rear part of an OFDM symbol (i.e., a copy source signal wave of the guard interval), thereby determining a boundary of OFDM symbols (see, for example, Japanese Unexamined Patent Application Publication No. 2001-292125). In this method, a time point at which a value of an autocorrelation function becomes a maximum value indicates the boundary of the OFDM symbols of each path.

In addition, in a second method for setting an FFT window, the above-described SP signals are used. In this method, transmission path characteristics are estimated regarding all of the OFDM symbols by interpolating SP signals with a time dimension interpolation filter after extracting the SP signals from the OFDM signals and removing modulation components from the SP signals. Then, an IFFT operation is performed on the estimated transmission path characteristics so as to generate a delay profile representing the signal strength of each path, and the boundary of OFDM symbols is determined on the basis of the earliest arriving path.

In addition, a third method for setting an FFT window is also known. In this method, a waveform of a guard interval is extracted from an OFDM signal not having undergone an FFT operation, and consistency of this waveform and a waveform of a rear part of an OFDM symbol is determined, thereby determining a boundary of OFDM symbols. In this method, a delay profile representing the signal strength of each path by determining the consistency of the waveforms is generated, and the boundary of the OFDM symbols are determined on the basis of an earliest arriving path.

Furthermore, recently, a method in which the above-described second and third methods are combined has also been suggested (see, for example, Japanese Unexamined Patent Application Publication No. 2004-153831). In this method, it is possible to remove a false path by comparing the delay profiles generated according to two methods even if the false path caused by noise is included in the delay profiles.

SUMMARY OF THE INVENTION

A method for use in frequency dimension interpolation performed on SP signals when estimating transmission path characteristics is known (see UK Patent Application Publication No. 2412551). In the method, N interpolation filers having pass bandwidths, the narrowest to the broadest, are provided, and one of the N interpolation filters is selected in accordance with a delay spread (a time difference between time points at which the earliest and latest arriving paths arrived) determined from the delay profile to yield an output of the frequency dimension interpolation. More specifically, in this method, an interpolation filter having a narrower bandwidth is selected when the delay spread is small, whereas an interpolation filter having a broader bandwidth is selected when the delay spread is large, thereby preventing accuracy of the estimation of the transmission path characteristics from decreasing.

When setting an FFT window, a position of a real path is detected from the delay profile, and an FFT processing starting position is adjusted on the basis of the earliest arriving path. Generally, as shown in FIG. 9, when one wave exists, the FFT processing starting position is adjusted at around a starting position of an effective symbol, and an SP signal is filtered with the interpolation filter having the narrowest bandwidth centered at the FFT processing starting position.

However, as shown in FIG. 10, since a path is estimated from the delay spread with some spreads and noise components also exist, the FFT processing starting position is shifted. When the FFT processing starting position is significantly shifted from the position of the path as shown in FIG. 11, the accuracy of the estimation of the transmission path characteristics is significantly decreases since the position of the path is in a transition region of the interpolation filter.

Embodiments of the present invention are made in view of such circumstances, and provide an OFDM demodulator, a receiver, and an OFDM demodulating method capable of preventing accuracy of the estimation of the transmission path characteristics from decreasing when estimating the transmission path characteristics by performing interpolation on a time-dimension interpolated SP signal in a frequency dimension.

To this end, an orthogonal frequency division multiplexing (OFDM) demodulator according to an embodiment of the present invention, which demodulates an OFDM signal constituted by OFDM symbols and transmitted on a symbol-by-symbol basis, the OFDM symbol including at least an effective symbol corresponding to a signal to be transmitted, a known signal being scattered onto a predetermined subcarrier in each of the transmission symbol, includes a Fourier transform performing unit for performing a Fourier transform operation on the OFDM signal, a known signal extracting unit for extracting the known signal, for each transmission symbol, from the signal having undergone the Fourier transform operation, a time dimension interpolation unit for performing interpolation on the extracted known signal in a time dimension using a time dimension interpolation filter, and estimating transmission path characteristics regarding all of the transmission symbols, a delay spread generating unit for generating a delay profile on the basis of at least one of the transmission path characteristics estimated by the time dimension interpolation unit and the OFDM signal not having undergone the Fourier transform operation, and determining a delay spread on the basis of the delay profile, a frequency dimension interpolation unit for performing interpolation on the known signal having undergone the time dimension interpolation in a frequency dimension using a frequency dimension interpolation filter having a pass bandwidth corresponding to the delay spread, and estimating transmission path characteristics of all of the subcarriers in the transmission symbols, and a waveform equalizing unit for equalizing a waveform of the signal having undergone the Fourier transform operation on the basis of the transmission path characteristics estimated by the frequency dimension interpolation unit. The delay spread generating unit employs a time difference between a time point for a starting position of the Fourier transform operation performed by the Fourier transform performing unit and a time point at which a latest arriving path arrived as the delay spread.

An orthogonal frequency division multiplexing (OFDM) demodulating method according to an embodiment of the present invention for demodulating an OFDM signal constituted by OFDM symbols and transmitted on a symbol-by-symbol basis, the OFDM symbol including at least an effective symbol corresponding to a signal to be transmitted, a known signal being scattered onto a predetermined subcarrier in each of the transmission symbol includes the steps of performing a Fourier transform operation on the OFDM signal, extracting the known signal, for each transmission symbol, from the signal having undergone the Fourier transform operation, performing interpolation on the extracted known signal in a time dimension using a time dimension interpolation filter, and estimating transmission path characteristics regarding all of the transmission symbols, generating a delay profile on the basis of at least one of the transmission path characteristics estimated at the step of performing the time dimension interpolation and the OFDM signal not having undergone the Fourier transform operation, and determining a delay spread on the basis of the delay profile, performing interpolation on the known signal having undergone the time dimension interpolation in a frequency dimension using a frequency dimension interpolation filter having a pass bandwidth corresponding to the delay spread, and estimating transmission path characteristics of all of the subcarriers in the transmission symbols, and equalizing a waveform of the signal having undergone the Fourier transform operation on the basis of the transmission path characteristics estimated at the step of performing the frequency dimension interpolation. At the step of generating the delay spread, a time difference between a time point for a starting position of the Fourier transform operation performed at the step of performing Fourier transform operation and a time point at which a latest arriving path arrived is employed as the delay spread.

The OFDM demodulator, the receiver, and the OFDM demodulating method according to the embodiments of the present invention do not employ a time difference between a time point at which the earliest arriving path arrived and a time point at which the latest arriving path arrived as the delay spread, which is different from the known method. The OFDM demodulator, the receiver, and the OFDM demodulating method employ a time difference between a time point at which Fourier transform operation is started and the time point the latest arriving path arrived as the delay spread, and performs an interpolation operation on the time-dimension-interpolated pilot signal in the frequency dimension using a frequency dimension interpolation filter having pass bandwidth corresponding to the delay spread. Accordingly, even when the FFT processing starting position is significantly shifted from the position of the path, it is possible to use the frequency dimension interpolation filter having the bandwidth corresponding to the shift and to prevent accuracy of the estimation of the transmission path characteristics from decreasing.

DESCRIPTION OF THE PREFERRED EMBODIMENTS

Specific embodiments of the present invention will be described in detail below with reference to the drawings.

Figure 1:
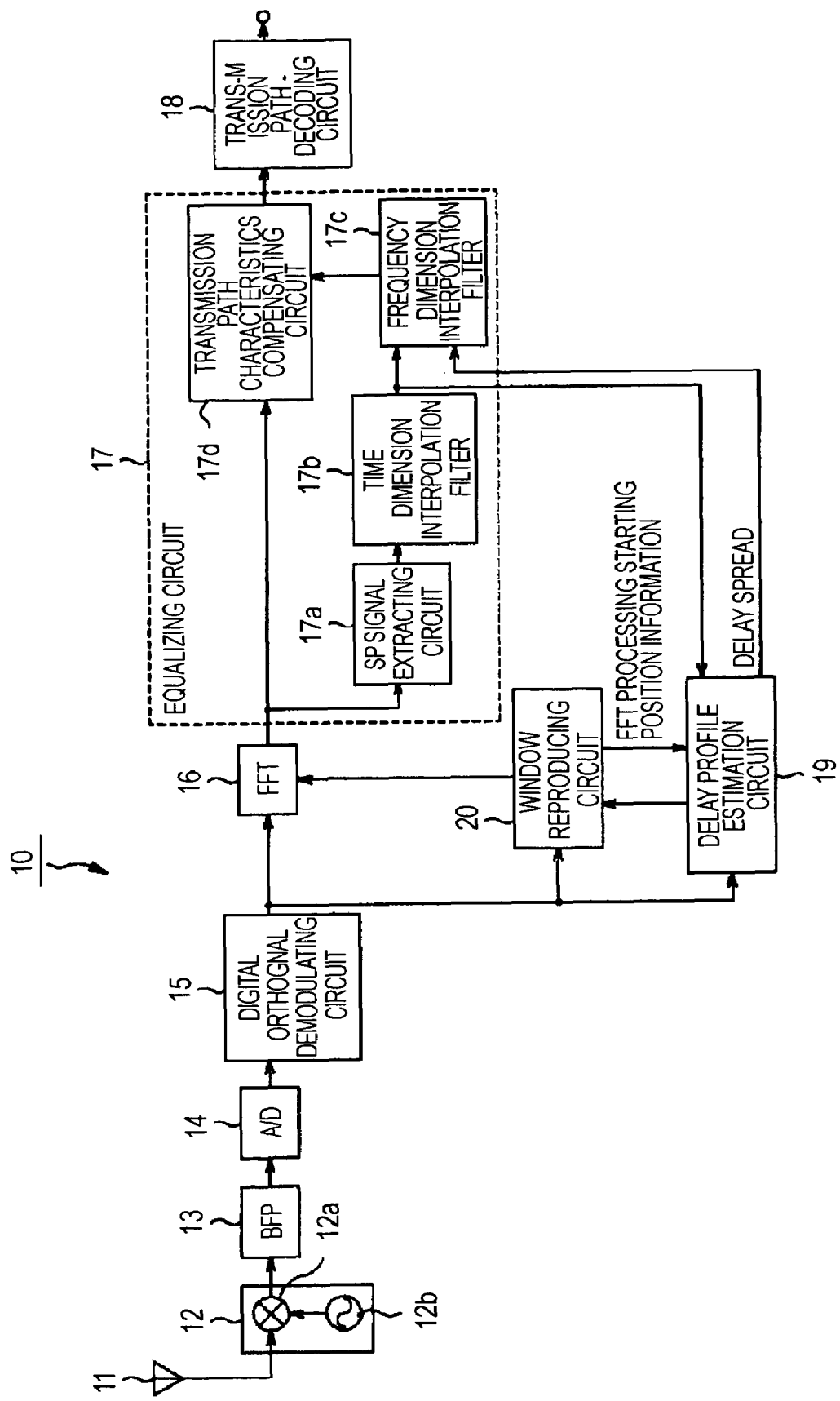
FIG. 1 is a block diagram showing an example of a configuration of an OFDM receiver according to an embodiment of the present invention.

Firstly, FIG. 1 shows a block diagram showing a configuration of an OFDM receiver according to an embodiment of the present invention.

As shown in FIG. 1, an OFDM receiver 10 according to the embodiment includes an antenna 11, a tuner 12, a bandpass filter (BPF) 13, an A/D converting circuit 14, a digital orthogonal demodulating circuit 15, an FFT processing circuit 16, an equalizing circuit 17, a transmission path decoding circuit 18, a delay profile estimation circuit 19, and a window reproducing circuit 20.

The antenna 11 of the OFDM receiver 10 receives a transmission wave transmitted from an OFDM transmitter, and supplies the received wave to the tuner 12 as an RF (radio frequency) signal.

The tuner 12 includes an adder 12a and a local oscillator 12b. The tuner 12 performs frequency conversion so as to convert the RF signal received by the antenna 11 into an IF (intermediate frequency) signal, and supplies the IF signal to the BPF 13.

After having undergone filtering performed by the BPF 13, the IF signal output from the tuner 12 is digitalized by the A/D converting circuit 14. The digitalized IF signal is then supplied to the digital orthogonal demodulating circuit 15.

The digital orthogonal demodulating circuit 15 performs orthogonal demodulation on the digitalized IF signal using a carrier signal having a predetermined frequency, and outputs baseband OFDM signals. The baseband OFDM signals output from the digital orthogonal demodulating circuit 15 corresponds to a so-called signal in a time domain not having undergone an FFT operation. For this reason, hereinafter, a baseband signal having undergone the orthogonal demodulation but not having undergone the FFT operation is referred to as an OFDM-time-domain signal. The OFDM-time-domain signal resulting from the orthogonal demodulation is a complex signal including a real component (I-channel signal) and an imaginary component (Q-channel signal). The OFDM-time-domain signal output from the digital orthogonal demodulating circuit 15 is supplied to the FFT processing circuit 16, the delay profile estimation circuit 19, and the window reproducing circuit 20.

The FFT processing circuit 16 performs the FFT operation on the OFDM-time-domain signal, and extracts and outputs data orthogonally modulated onto each subcarrier. The signal output from the FFT processing circuit 16 is a so-called signal in a frequency domain having undergone the FFT operation. For this reason, hereinafter, the signal having undergone the FFT operation is referred to as an OFDM-frequency-domain signal.

The FFT processing circuit 16 extracts signals in the range of an effective symbol length (e.g., 2048 samples) from one OFDM symbol, or excludes signals in the range of a guard interval from one OFDM symbol, and performs the FFT operation on the extracted 2048-sample OFDM-time-domain signals. More specifically, the start position of the operation is between the boundary of OFDM symbols and the end of the guard interval. The operation range is referred to as an FFT window.

Accordingly, the OFDM-frequency domain signal output from the FFT processing circuit 16, like the OFDM-time-domain signal, is a complex signal including a real component (I-channel signal) and an imaginary component (Q-channel signal). This complex signal corresponds to a signal having undergone quadrature amplitude modulation according to, for example, 16 QAM or 64 QAM. The OFDM-frequency-domain signal is supplied to the equalizing circuit 17.

The equalizing circuit 17 includes an SP signal extracting circuit 17a, a time dimension interpolation filter 17b, a frequency dimension interpolation filter 17c, and transmission path characteristics compensating circuit 17d.

Figure 6:
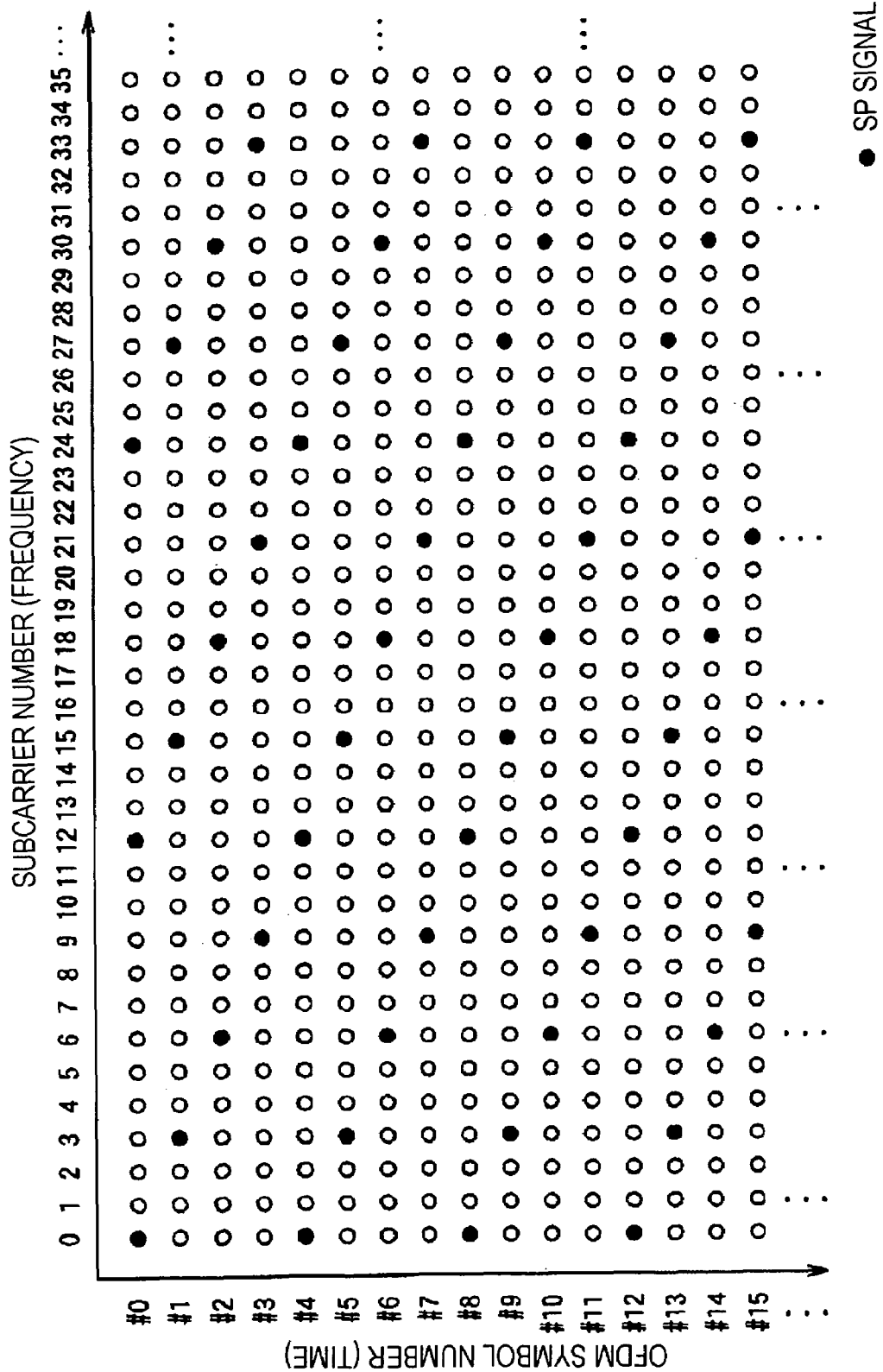
FIG. 6 is a diagram illustrating positions at which SP signals are embedded in an OFDM signal.

The SP signal extracting circuit 17a removes information components from the OFDM-frequency-domain signal, and extracts only SP signals inserted at positions shown in FIG. 6. Modulation components are removed from the SP signals by determining a difference between the extracted SP signal and a reference SP signal. The modulation-component-free SP signal shows transmission path characteristics of a subcarrier having the SP signal.

Figure 7:
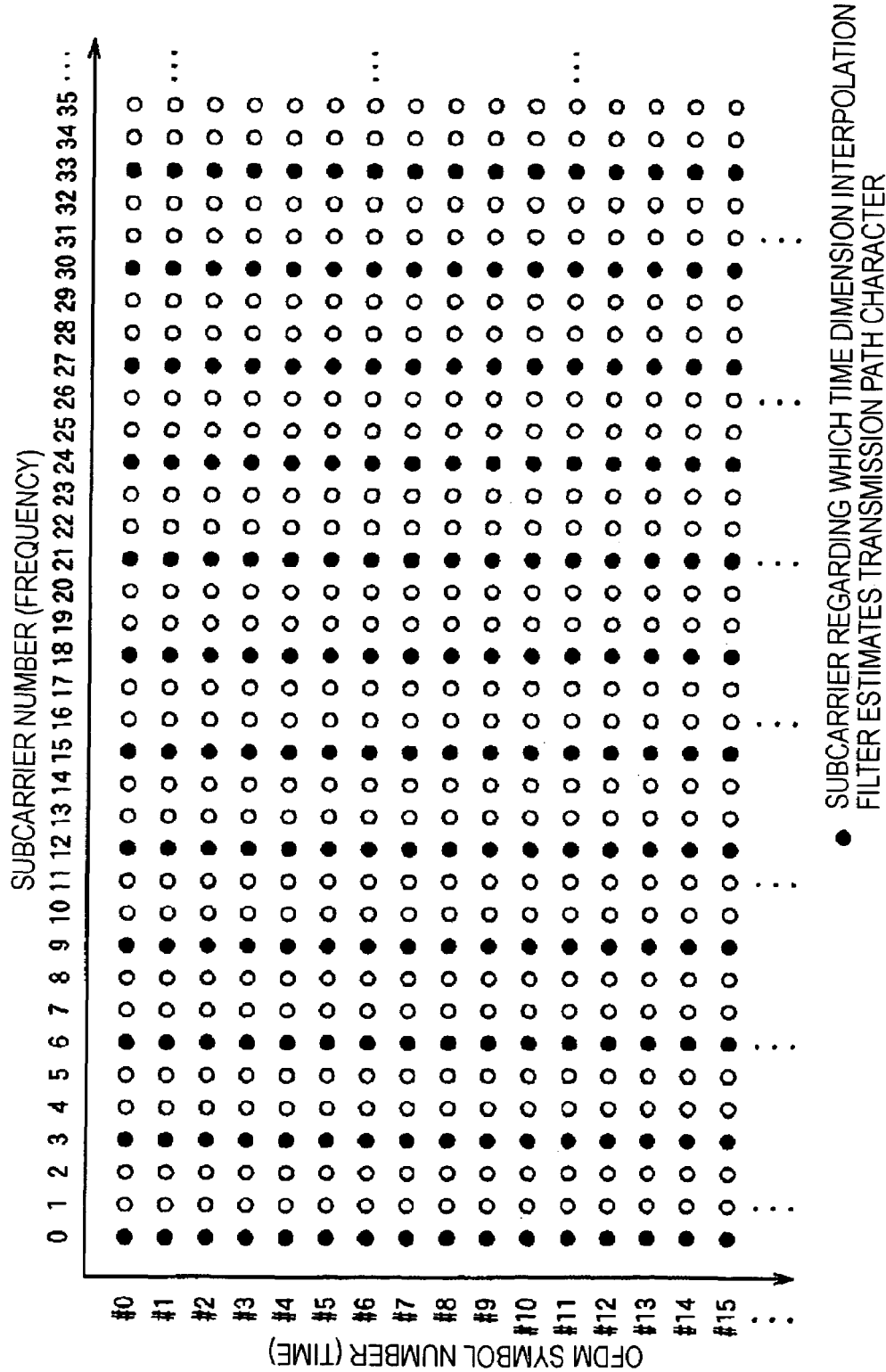
FIG. 7 is a diagram illustrating subcarriers regarding which transmission path characteristics are estimated by a time dimension interpolation operation.
Figure 8:
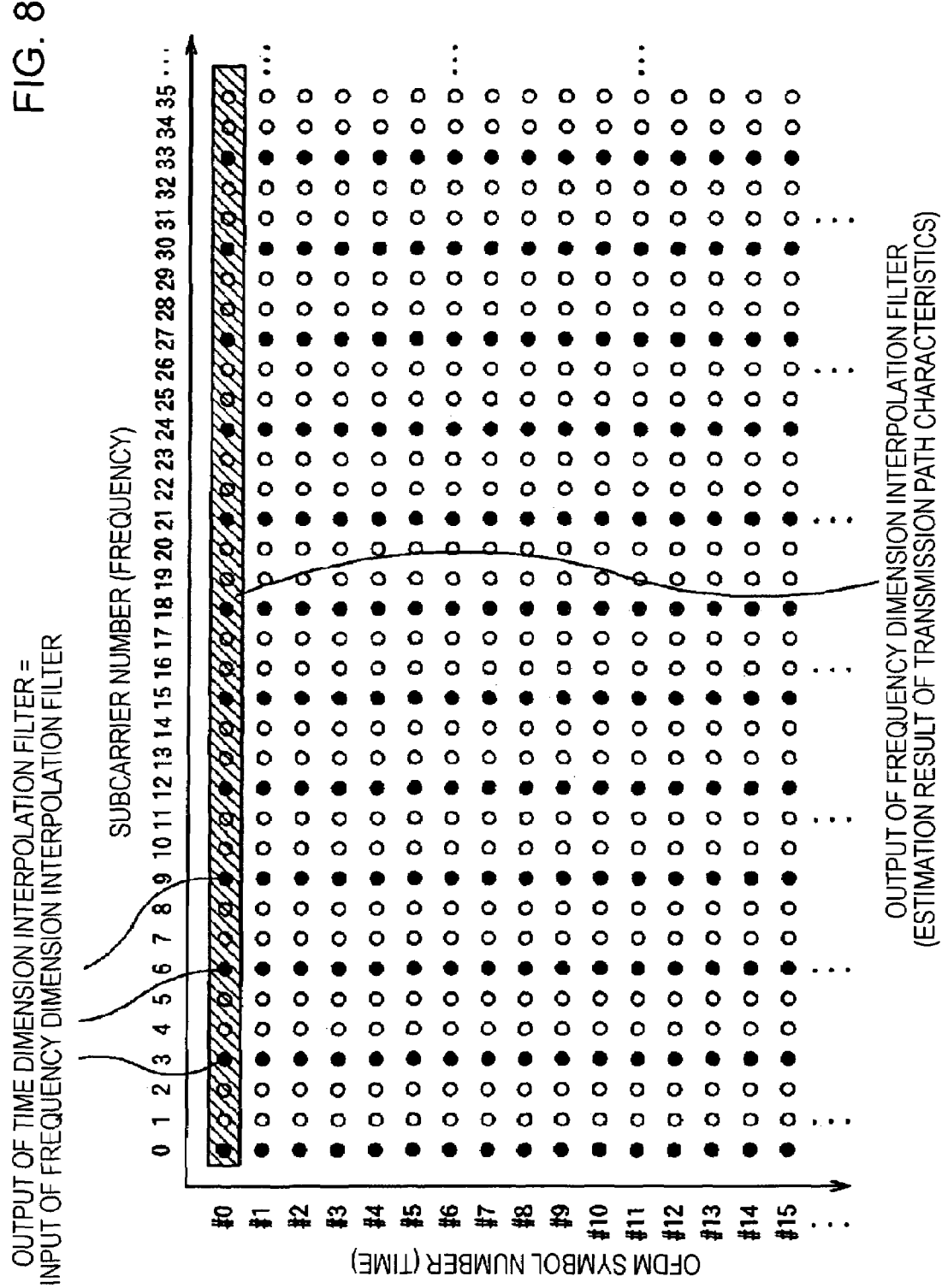
FIG. 8 is a diagram illustrating a frequency dimension interpolation operation performed at the time of estimation of transmission path characteristics.
Figure 9:
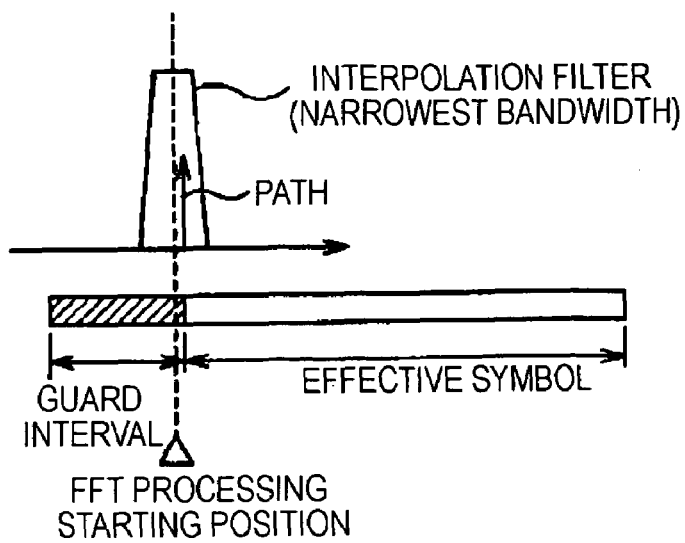
FIG. 9 is a diagram illustrating a known general frequency dimension interpolation operation.
Figure 10:
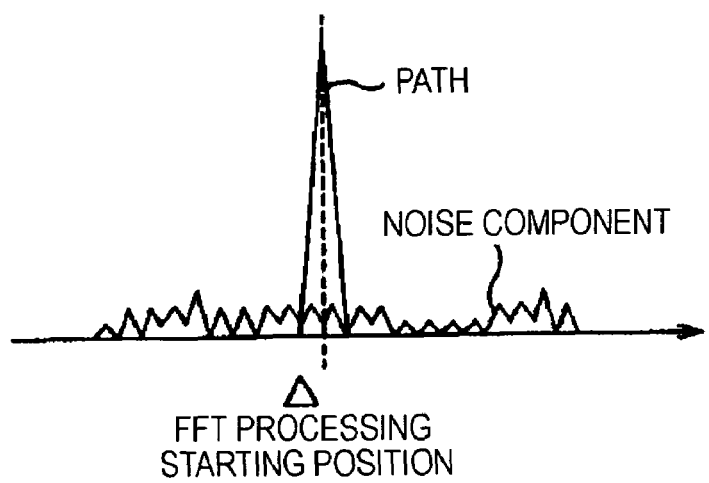
FIG. 10 is a diagram illustrating an example of a delay profile.
Figure 11:
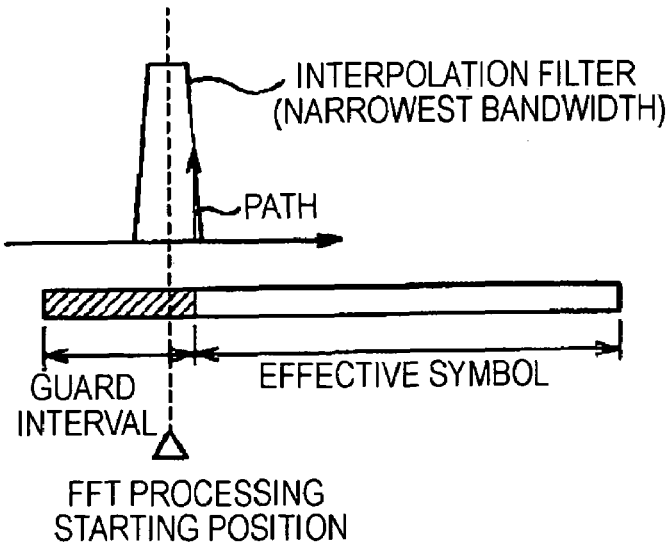
FIG. 11 is a diagram illustrating a known frequency dimension interpolation operation performed when an FFT processing starting position is shifted.

The time dimension interpolation filter 17b performs time dimension interpolation on the modulation-component-free SP signal, and estimates the transmission path characteristics of subcarriers having the SP signals for each OFDM symbol. As a result, as shown in FIG. 7, it is possible to estimate the transmission path characteristics for every three subcarriers in the frequency dimension of all OFDM symbols. The time-dimension-interpolated SP signal is then supplied to the frequency dimension interpolation filter 17c and the delay profile estimation circuit 19.

The frequency dimension interpolation filter 17c interpolates the time-domain-interpolated SP signal in the frequency dimension, thereby estimating the transmission path characteristics of all of the subcarriers in the OFDM symbol. Particularly, the frequency dimension interpolation filter 17c includes N (N is a positive integer) interpolation filters having the narrowest bandwidth to the broadest bandwidth. According to delay spreads, which are determined on the basis of the delay profile and the FFT processing starting position information, one of the N outputs of the interpolation filters is selected. The frequency dimension interpolation filter 17c will be described in detail below.

The transmission path characteristics compensating circuit 17d equalizes the phase and amplitude of the OFDM-frequency-domain signal using the transmission path characteristics estimated by the frequency dimension interpolation filter 17c. The transmission path characteristics compensating circuit 17d supplies the OFDM-frequency-domain signal having undergone the phase equalization and amplitude equalization to the transmission path decoding circuit 18.

The transmission path decoding circuit 18 performs operations, such as carrier demodulation, deinterleaving, demapping, depuncturing, Viterbi decoding, and error correction, on the OFDM-frequency-domain signal having undergone the phase and amplitude equalization so as to output a transport stream.

The delay profile estimation circuit 19 generates a delay profile on the basis of the OFDM-time-domain signal supplied from the digital orthogonal demodulating circuit 15 and the transmission path characteristics supplied from the time dimension interpolation filter 17b. The delay profile estimation circuit 19 then supplies the generated delay profile to the frequency dimension interpolation filter 17c and the window reproducing circuit 20. In addition, the delay profile estimation circuit 19 determines a delay spread on the basis of the delay profile and the FFT processing starting position information supplied from the window reproducing circuit 20, and supplies the determined delay spread to the frequency dimension interpolation filter 17c. The delay profile estimation circuit 19 will be described in detail below.

The window reproducing circuit 20 detects boundary positions of OFDM symbols using the OFDM-time-domain signal supplied from the digital orthogonal demodulating circuit 15 and the delay profile supplied from the delay profile estimation circuit 19. The window reproducing circuit 20 then generates a trigger instructing the timing of starting the FFT operation on the basis of the detected symbol boundary positions, and supplies the generated trigger to the FFT processing circuit 16. The window reproducing circuit 20 can detect the symbol boundary positions on the basis of the correlation of the waveform of the guard interval of the delayed OFDM-time-domain signal. In addition, the window reproducing circuit 20 can also detect the symbol boundary of an earliest arriving path using the delay profile supplied from the delay profile estimation circuit 19. Furthermore, the window reproducing circuit 20 supplies the FFT processing starting position information that indicates the timing of starting the FFT operation to the delay profile estimation circuit 19.

The OFDM receiver 10 having the above configuration receives and demodulates OFDM signals broadcast as terrestrial digital broadcasting waves, and decodes the demodulated signals, thereby being able to output a transport stream including, for example, audio and video signals.

In the following, the above-described delay profile estimation circuit 19 and the frequency dimension interpolation filter 17c will be described in detail.

Figure 2:
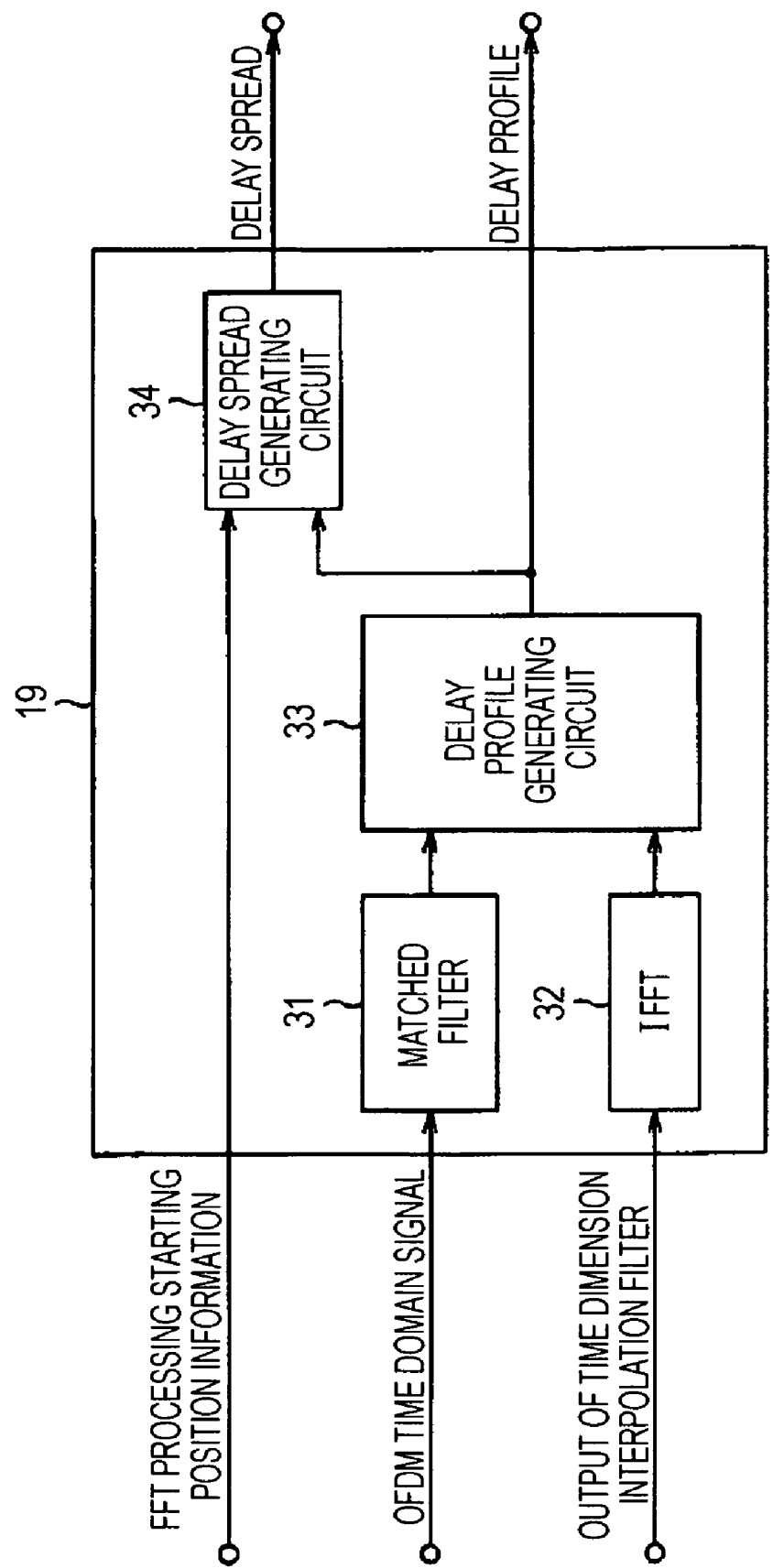
FIG. 2 is a block diagram showing an example of a configuration of a delay profile estimation circuit in the OFDM receiver.

FIG. 2 is a block diagram showing an example of a configuration of the delay profile estimation circuit 19.

A matched filter 31 in the delay profile estimation circuit 19 shown in FIG. 2 employs a level of a signal included in the guard interval part as a tap coefficient and determines consistency of a waveform of the guard interval extracted from the OFDM-time-domain signal and that of a rear part of the OFDM symbol, thereby generating the delay profile representing signal strength of each path. The matched filter 31 is described in Japanese Unexamined Patent Application Publication No. 2004-153831 in detail. The matched filter 31 supplies the generated delay profile to a delay profile generating circuit 33.

An IFFT processing circuit 32 performs an IFFT operation on the transmission path characteristics supplied from the time dimension interpolation filter 17b, thereby generating a delay profile representing the signal intensity of each path. The IFFT processing circuit 32 then supplies the generated delay profile to the delay profile generating circuit 33.

The delay profile generating circuit 33 compares the delay profile supplied from the matched filter 31 with the delay profile supplied from the IFFT processing circuit 32 so as to eliminate a false path. The delay profile generating circuit 33 supplies the false-path free delay profile to a delay spread generating circuit 34, the frequency dimension interpolation filter 17c, and the window reproducing circuit 20.

The delay profile generating circuit 33 does not necessarily have to compare two delay profiles, and can use one of the delay profiles.

Figure 3:
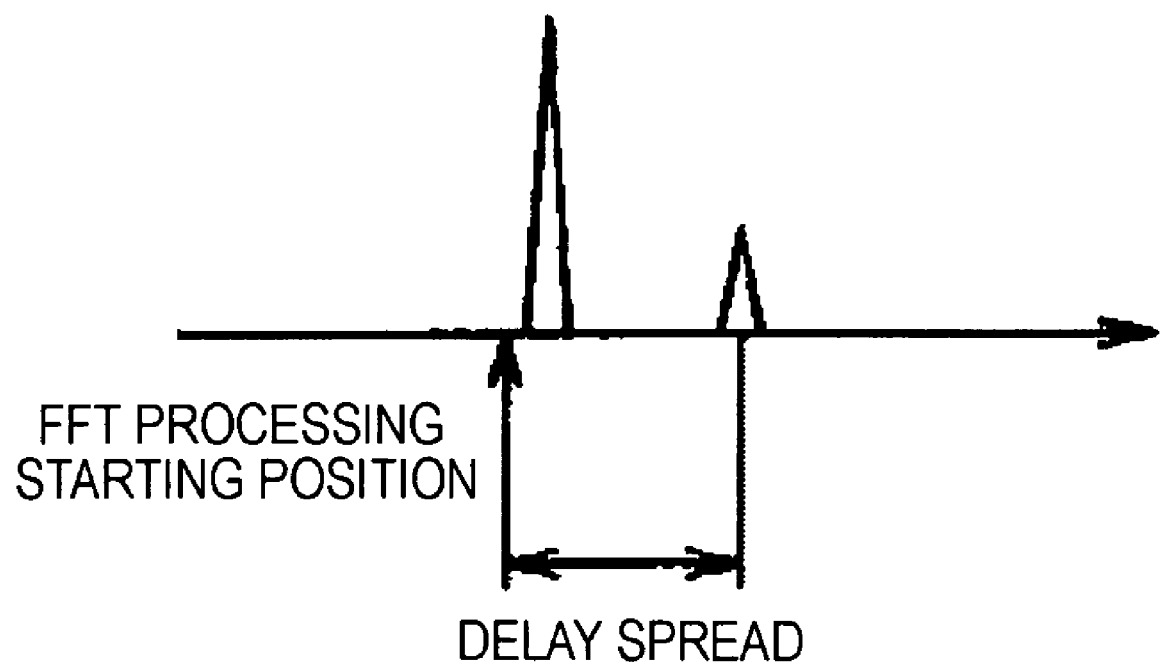
FIG. 3 is a diagram illustrating a method for generating delay spreads performed by a delay spread generating circuit in the delay profile estimation circuit.

The delay spread generating circuit 34 determines the delay spread on the basis of the delay profile supplied form the delay profile generating circuit 33 and the FFT processing starting position information supplied from the window reproducing circuit 20. The determined delay spread is supplied to the frequency dimension interpolation filter 17c. Particularly, the delay spread generating circuit 34 does not employs the time difference between a time point at which the earliest arriving path arrived and a time point at which the latest arriving path arrived as the delay spread, which is different from the known method. The delay spread generating circuit 34 employs the time difference between a time point for the FFT processing starting position and a time point at which the latest arriving path arrived as the delay spread as shown in FIG. 3.

Figure 4:
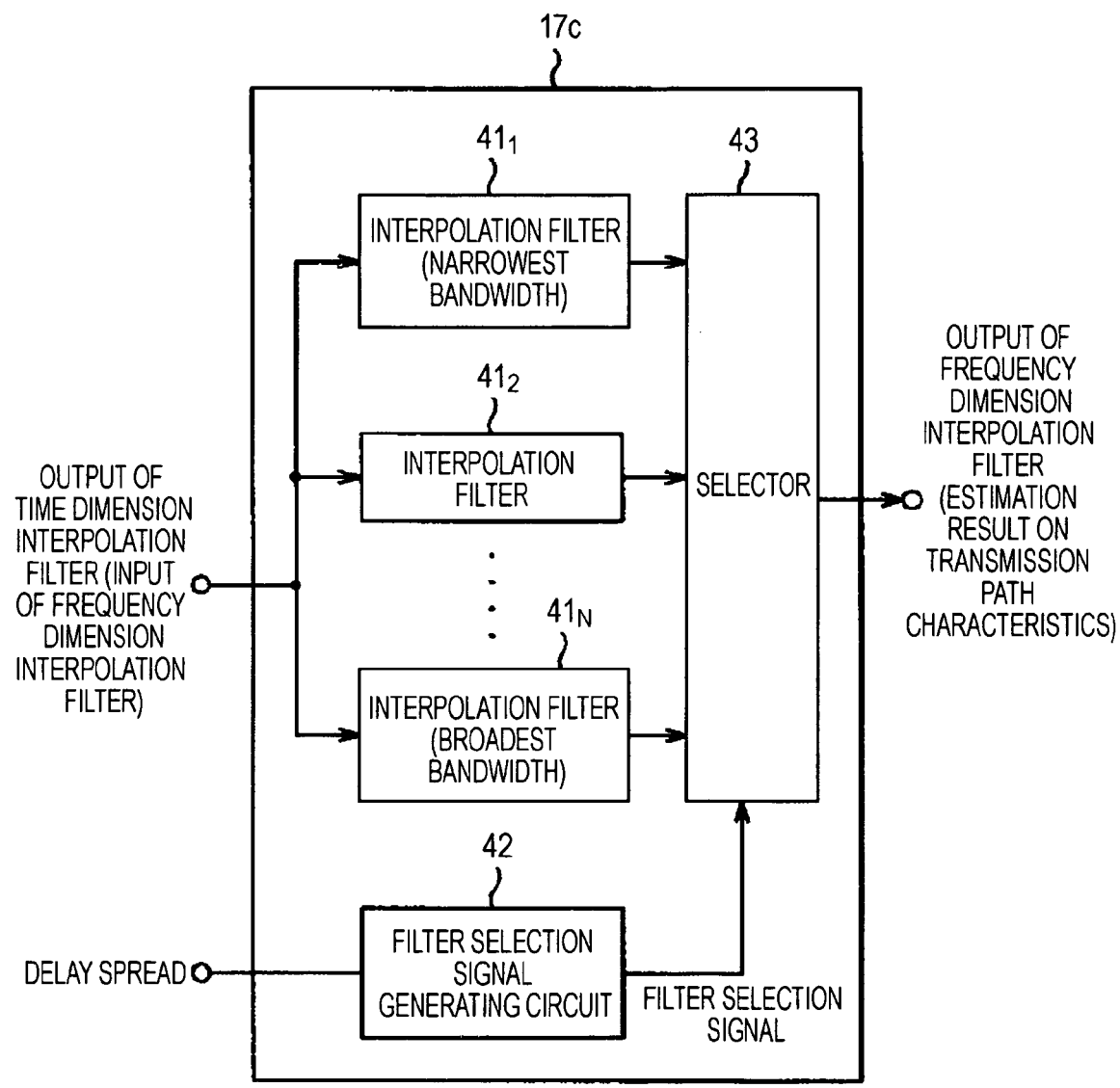
FIG. 4 is a block diagram showing an example of a configuration of a frequency dimension interpolation filter in the OFDM receiver.
Figure 5:
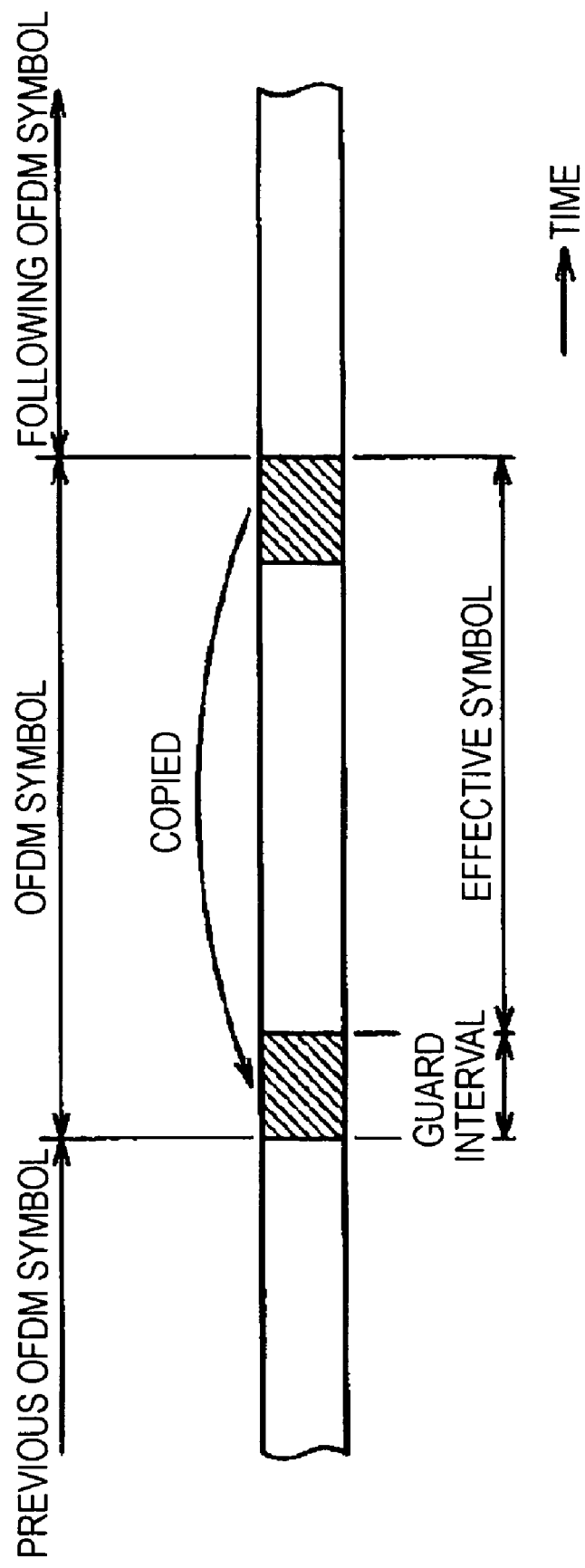
FIG. 5 is a diagram illustrating an OFDM signal, an OFDM symbol, an effective symbol, and a guard interval.

FIG. 4 is a block diagram showing an example of a configuration of the frequency dimension interpolation filter 17c.

The frequency dimension interpolation filter 17c shown in FIG. 4 includes interpolation filters $41_1$ to $41_N$, having pass bandwidths from the narrowest and to the broadest, with each of which interpolation is performed on the time-dimension-interpolated SP signal in the frequency dimension.

A filter selection signal generating circuit 42 generates a filter selection signal indicating a filter selected from the N interpolation filters $41_1$ to $41_N$ on the basis of the delay spread supplied from the delay profile estimation circuit 19. More specifically, the filter selection signal generating circuit 42 generates the filter selection signal so that the interpolation filter having a broader bandwidth is selected as the delay spread increases.

A selector 43 selects one of the outputs from the interpolation filters $41_1$ to $41_N$ on the basis of the filter selection signal as an output of the frequency dimension interpolation filter 17c.

As described above, the delay profile estimation circuit 19 and the frequency dimension interpolation filter 17c according to the embodiments of the present invention do not employ the time difference between the time point at which the earliest arriving path arrived and the time point at which the latest arriving path arrived as the delay spread, which is different from the known method, but employs the time difference between a time point at which Fourier transform operation is started and the time point the latest arriving path arrived as the delay spread, and select one of the outputs from the interpolation filters having bandwidths from the narrowest to the broadest in accordance with the delay spread. Accordingly, even when the FFT processing starting position is significantly shifted from the position of the path, it is possible to select the output of the interpolation filter having the broader bandwidth in accordance with the shift, thereby preventing accuracy of the estimation of the transmission path characteristics from decreasing.

While the embodiments of the present invention have been described, it should be noted that the preset invention is not limited to the above-described particular embodiments. It is obvious that various modifications and applications may occur without departing from the technical spirit and scope of the invention.

What is claimed is:

1. An orthogonal frequency division multiplexing (OFDM) demodulator that demodulates an OFDM signal constituted by OFDM symbols and transmitted on a symbol-by-symbol basis, the OFDM symbol including at least an effective symbol corresponding to a signal to be transmitted, a known signal being scattered onto a predetermined subcarrier in each of the transmission symbol, the OFDM demodulator comprising:
   a Fourier transform performing unit for performing a Fourier transform operation on the OFDM signal;
   a known signal extracting unit for extracting the known signal, for each transmission symbol, from the signal having undergone the Fourier transform operation;
   a time dimension interpolation unit for performing interpolation on the extracted known signal in a time dimension using a time dimension interpolation filter, and estimating transmission path characteristics regarding all of the transmission symbols;
   a delay spread generating unit for generating a delay profile on the basis of at least one of the transmission path characteristics estimated by the time dimension interpolation unit and the OFDM signal not having undergone the Fourier transform operation, and determining a delay spread on the basis of the delay profile;
   a frequency dimension interpolation unit for performing interpolation on the known signal having undergone the time dimension interpolation in a frequency dimension using a frequency dimension interpolation filter having a pass bandwidth corresponding to the delay spread, and estimating transmission path characteristics of all of the subcarriers in the transmission symbols; and
   a waveform equalizing unit for equalizing a waveform of the signal having undergone the Fourier transform operation on the basis of the transmission path characteristics estimated by the frequency dimension interpolation unit, wherein
   the delay spread generating unit employs a time difference between a time point for a starting position of the Fourier transform operation performed by the Fourier transform performing unit and a time point at which a latest arriving path arrived as the delay spread.

2. The demodulator to claim 1, wherein the frequency dimension interpolation unit uses the frequency dimension interpolation filter having a broader pass bandwidth as the delay spread increases.

3. The demodulator according to claim 1, wherein the delay spread generating unit generates the delay profile by performing an inverse Fourier transform operation on the transmission path characteristics estimated by the time dimension interpolation unit for each transmission symbol.

4. The demodulator according to claim 1, wherein the delay spread generating unit sets a signal in a guard interval part contained in each transmission symbol as a tap coefficient, and determines the consistency between a waveform of the guard interval part extracted from each transmission symbol and a waveform of the other part of the transmission symbol to generate the delay profile.

5. The demodulator according to claim 1, further comprising:
   an antenna for receiving the OFDM signal transmitted from a transmitter; and
   a radio frequency processing unit for performing signal processing on the OFDM signal received by the antenna and supplies the processed signal to the Fourier transform performing unit.

6. A receiver that receives and demodulates an orthogonal frequency division multiplexing (OFDM) signal constituted by OFDM symbols and transmitted on a symbol-by-symbol basis, the OFDM symbol including at least an effective symbol corresponding to a signal to be transmitted, a known signal being scattered onto a predetermined subcarrier in each of the transmission symbol, the receiver comprising:
- a Fourier transform performing unit for performing a Fourier transform operation on the OFDM signal;
- a known signal extracting unit for extracting the known signal, for each transmission symbol, from the signal having undergone the Fourier transform operation;
- a time dimension interpolation unit for performing interpolation on the extracted known signal in a time dimension using a time dimension interpolation filter, and estimating transmission path characteristics regarding all of the transmission symbols;
- a delay spread generating unit for generating a delay profile on the basis of at least one of the transmission path characteristics estimated by the time dimension interpolation unit and the OFDM signal not having undergone the Fourier transform operation, and determining a delay spread on the basis of the delay profile;
- a frequency dimension interpolation unit for performing interpolation on the known signal having undergone the time dimension interpolation in a frequency dimension using a frequency dimension interpolation filter having a pass bandwidth corresponding to the delay spread, and estimating transmission path characteristics of all of the subcarriers in the transmission symbols; and
- a waveform equalizing unit for equalizing a waveform of the signal having undergone the Fourier transform operation on the basis of the transmission path characteristics estimated by the frequency dimension interpolation unit, wherein
- the delay spread generating unit employs a time difference between a time point for a starting position of the Fourier transform operation performed by the Fourier transform performing unit and a time point at which a latest arriving path arrived as the delay spread.

7. An orthogonal frequency division multiplexing (OFDM) demodulating method for demodulating an OFDM signal constituted by OFDM symbols and transmitted on a symbol-by-symbol basis, the OFDM symbol including at least an effective symbol corresponding to a signal to be transmitted, a known signal being scattered onto a predetermined subcarrier in each of the transmission symbol, the method comprising the steps of:
- performing a Fourier transform operation on the OFDM signal;
- extracting the known signal, for each transmission symbol, from the signal having undergone the Fourier transform operation;
- performing interpolation on the extracted known signal in a time dimension using a time dimension interpolation filter, and estimating transmission path characteristics regarding all of the transmission symbols;
- generating a delay profile on the basis of at least one of the transmission path characteristics estimated at the step of performing the time dimension interpolation and the OFDM signal not having undergone the Fourier transform operation, and determining a delay spread on the basis of the delay profile;
- performing interpolation on the known signal having undergone the time dimension interpolation in a frequency dimension using a frequency dimension interpolation filter having a pass bandwidth corresponding to the delay spread, and estimating transmission path characteristics of all of the subcarriers in the transmission symbols; and
- equalizing a waveform of the signal having undergone the Fourier transform operation on the basis of the transmission path characteristics estimated at the step of performing the frequency dimension interpolation, wherein
- at the step of generating the delay spread, a time difference between a time point for a starting position of the Fourier transform operation performed at the step of performing the Fourier transform operation and a time point at which a latest arriving path arrived is employed as the delay spread.

* * * * *